(12) United States Patent
Hayakawa et al.

(10) Patent No.: US 10,446,026 B2
(45) Date of Patent: Oct. 15, 2019

(54) ON-VEHICLE DEVICE AND ROAD ABNORMALITY ALERT SYSTEM

(71) Applicant: Sumitomo Electric Industries, Ltd., Osaka-shi (JP)

(72) Inventors: Jun Hayakawa, Osaka (JP); Akira Suwa, Osaka (JP); Susumu Takeshima, Osaka (JP)

(73) Assignee: Sumitomo Electric Industries, Inc., Osaka-shi (JP)

( * ) Notice: Subject to any disclaimer, the term of this patent is extended or adjusted under 35 U.S.C. 154(b) by 0 days.

(21) Appl. No.: 16/074,509

(22) PCT Filed: Jan. 30, 2017

(86) PCT No.: PCT/JP2017/003125
§ 371 (c)(1),
(2) Date: Aug. 1, 2018

(87) PCT Pub. No.: WO2017/145650
PCT Pub. Date: Aug. 31, 2017

(65) Prior Publication Data
US 2019/0043274 A1 Feb. 7, 2019

(30) Foreign Application Priority Data

Feb. 25, 2016 (JP) ................................. 2016-034635

(51) Int. Cl.
*G08G 1/00* (2006.01)
*G08G 1/0967* (2006.01)
(Continued)

(52) U.S. Cl.
CPC . *G08G 1/096775* (2013.01); *G08G 1/096741* (2013.01); *G08G 1/164* (2013.01);
(Continued)

(58) Field of Classification Search
CPC ....... G08G 1/096716; G08G 1/096741; G08G 1/096775; G08G 1/164; G08G 1/166;
(Continued)

(56) References Cited

U.S. PATENT DOCUMENTS 9,841,286 B1 * 12/2017 Hayward ............... G08G 1/166
2013/0116859 A1 * 5/2013 Ihlenburg ................ G06F 17/00
701/2

(Continued)

FOREIGN PATENT DOCUMENTS

JP 2008-234044 A 10/2008
JP 2014-044584 A 3/2014
(Continued)

*Primary Examiner* — Van T Trieu
(74) *Attorney, Agent, or Firm* — Baker Botts L.L.P.; Michael A. Sartori

(57) ABSTRACT

An on-vehicle device comprises an image data acquisition unit that acquires image data obtained by photographing a road from a vehicle, an object detection unit that detects an object included in an image of the road, a location detection unit that detects a location of the vehicle, an image data transmission unit that, in the case where the object is detected by the object detection unit, transmits to an external device image data including the object and location information of the vehicle at the time of detecting the object, and an previously-notifying information transmission unit that transmits to another vehicle previously-notifying abnormality information including the location information of the vehicle at the time of detecting the object and previously notifying abnormality on the road.

6 Claims, 9 Drawing Sheets

(51) Int. Cl.
*G08G 1/16* (2006.01)
*G08G 1/09* (2006.01)

(52) U.S. Cl.
CPC ............... *G08G 1/166* (2013.01); *G08G 1/00* (2013.01); *G08G 1/09* (2013.01)

(58) Field of Classification Search
CPC ...... G08G 1/167; G01C 21/00; G01C 21/005; G01C 21/34; G01C 21/3415; G01C 21/3492; G01C 21/36
See application file for complete search history.

(56) References Cited

U.S. PATENT DOCUMENTS

2013/0147955 A1* 6/2013 Oosugi ............ G08G 1/096716
348/148
2017/0313297 A1* 11/2017 Okada .................... G08G 1/09

FOREIGN PATENT DOCUMENTS

| JP | 2015-138316 A | 7/2015 |
| WO | 2014-119196 A1 | 8/2014 |

\* cited by examiner

FIG. 7
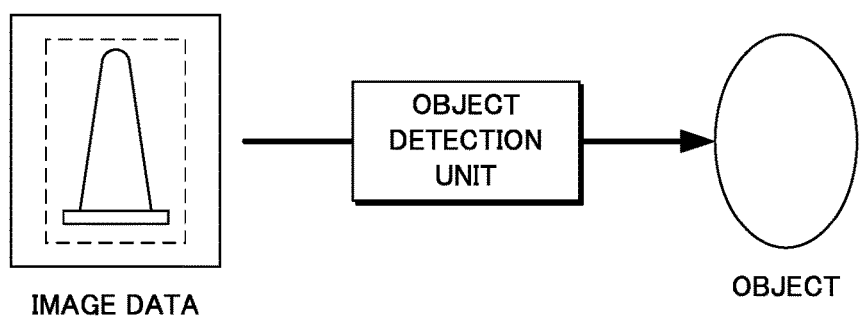
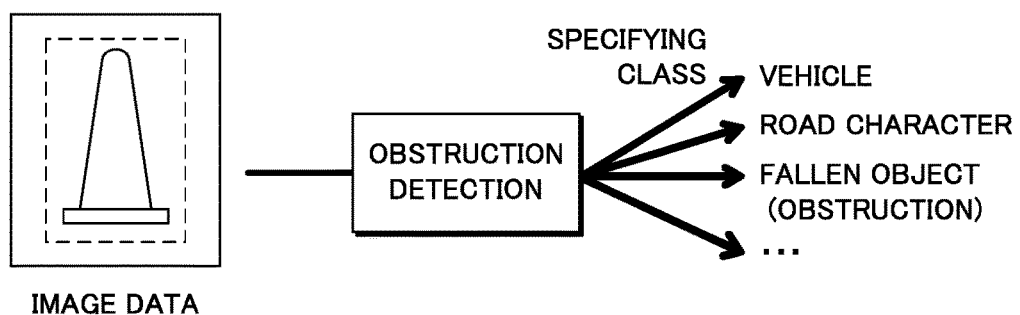

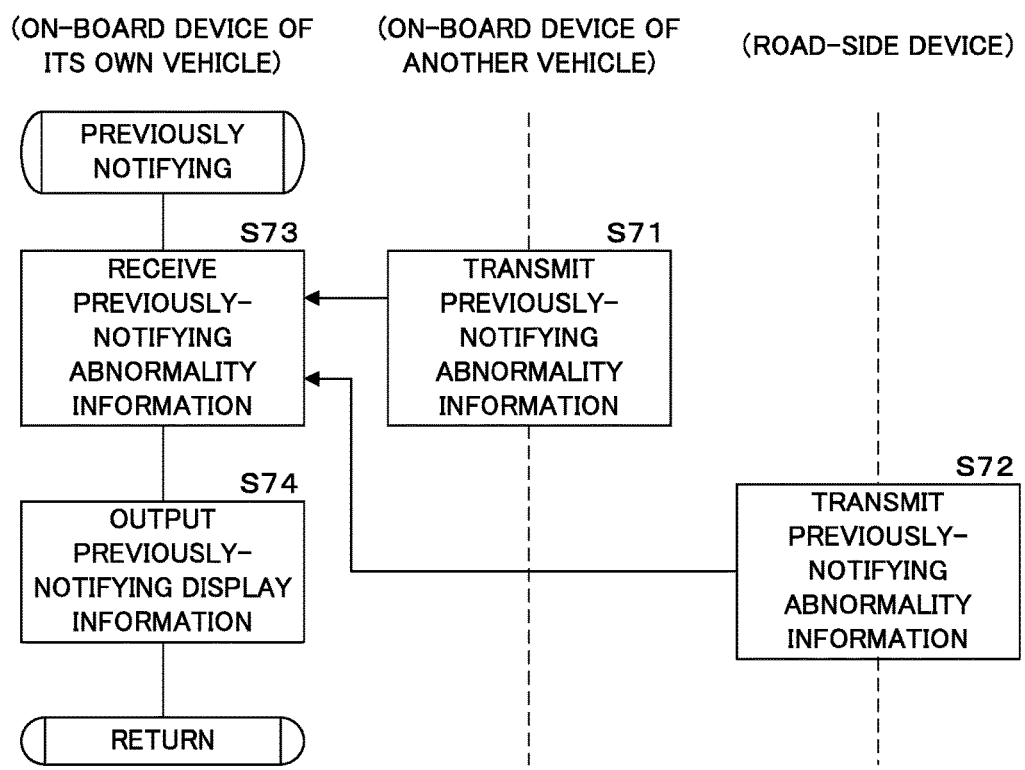

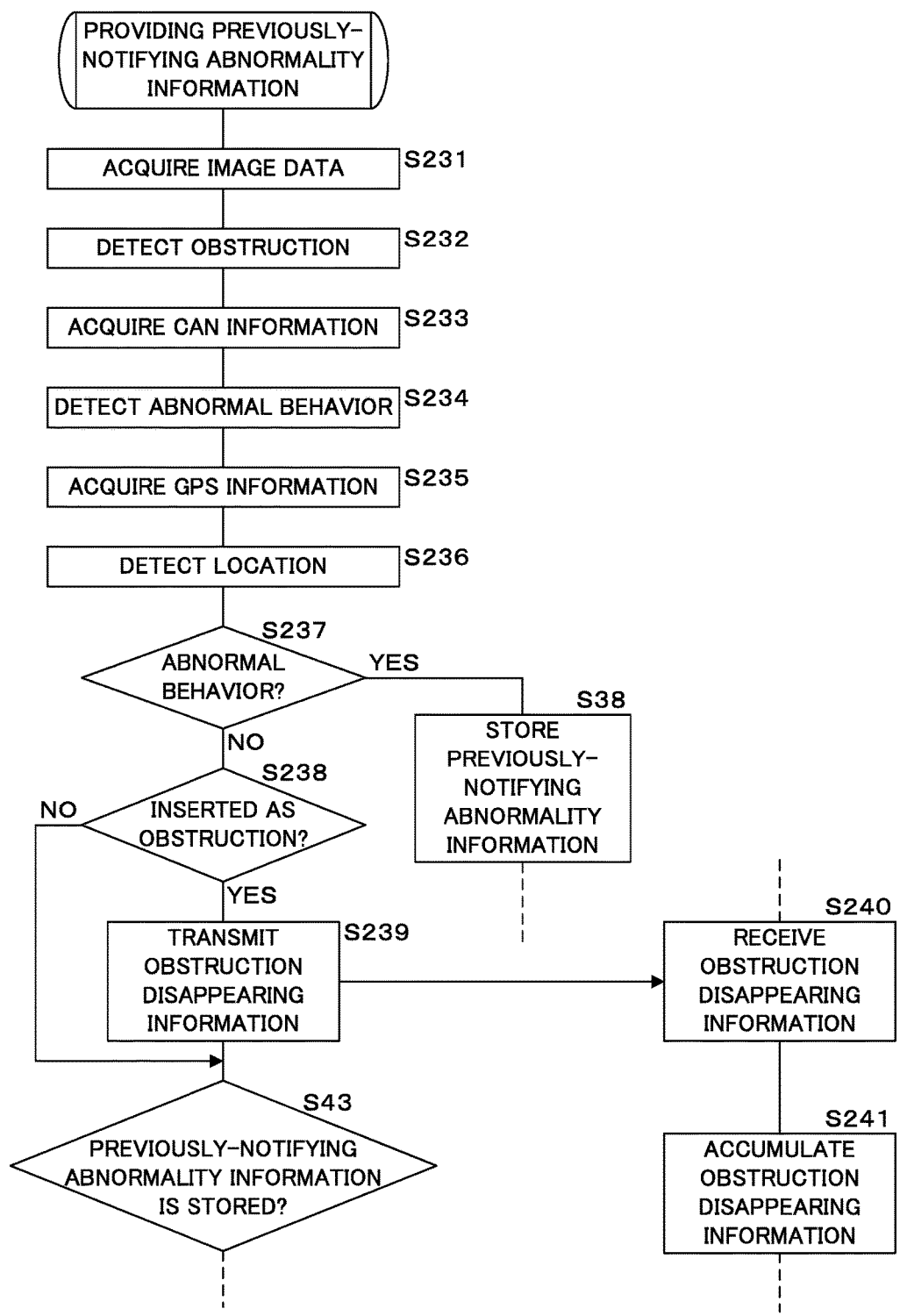

ON-VEHICLE DEVICE AND ROAD ABNORMALITY ALERT SYSTEM

CROSS-REFERENCE TO RELATED APPLICATIONS

This application is the national phase under 35 U.S.C. § 371 of PCT International Application No. PCT/JP2017/003125 which has an International filing date of Jan. 30, 2017 and designated the United States of America.

FIELD

The present invention relates to an on-vehicle device and a road abnormality alert system. The present application claims the benefit of Japanese Patent Application No. 2016-34635 filed on Feb. 25, 2016, the entire contents of which are herein incorporated by reference.

BACKGROUND

An anomalous travel place detection device that collects information indicative of the behavior of a vehicle to detect an anomalous traveling place where anomalous traveling by the vehicle occurs has been disclosed (Japanese Patent Application Laid-Open No. 2015-138316, for example).

The information on the anomalous traveling place specified by the anomalous travel place detection device is provided to another vehicle traveling on the road.

SUMMARY

An on-vehicle device according to a present aspect comprises: an image data acquisition unit that acquires image data obtained by photographing a road from a vehicle; an object detection unit that detects an object included in an image of the road; a location detection unit that detects a location of the vehicle; an image data transmission unit that, in the case where the object is detected by the object detection unit, transmits to an external device image data including the object and location information of the vehicle at the time of detection of the object, and an previously-notifying information transmission unit that transmits to another vehicle previously-notifying abnormality information including the location information of the vehicle at the time of detecting the object and previously notifying abnormality on the road.

A road abnormality alert system according to the present aspect comprises an external device that collects image data obtained by photographing a road and location information of the road to detect an obstruction on the road and provides obstruction information indicating a location of the road where the obstruction is detected, and a plurality of on-vehicle devices that receive the obstruction information provided from the external device and alert a driver to abnormality on the road based on the received obstruction information. A first on-vehicle device is the on-vehicle device, and a second on-vehicle device comprises an previously-notifying information reception unit that receives previously-notifying abnormality information transmitted from the first on-vehicle device and an abnormality previously-notifying unit that previously notifies abnormality on the road in the case where the previously-notifying abnormality information is received by the previously-notifying information reception unit.

The present application not only may be implemented as an on-vehicle device and a road abnormality alert system with such a characteristic processing unit but may be implemented as a road abnormality alert method with such characteristic processing as steps or may be implemented as a program causing a computer to execute such steps. Furthermore, the present application may be implemented as a semiconductor integrated circuit for achieving a part or all of the on-vehicle device and the road abnormality alert system or may be implemented as a different system including an on-vehicle device and a road abnormality alert system.

The above and further objects and features will more fully be apparent from the following detailed description with accompanying drawings.

BRIEF DESCRIPTION OF THE DRAWINGS

FIG. 7 is a schematic view illustrating object detection and obstruction detection.

FIG. 8 is a flowchart illustrating a processing procedure concerning previously notifying abnormality.

FIG. 9 is a flowchart illustrating a processing procedure concerning provision of previously-notifying abnormality information according to Embodiment 2.

DETAILED DESCRIPTION

[Problems to be Solved by Disclosure]

Figure 1:
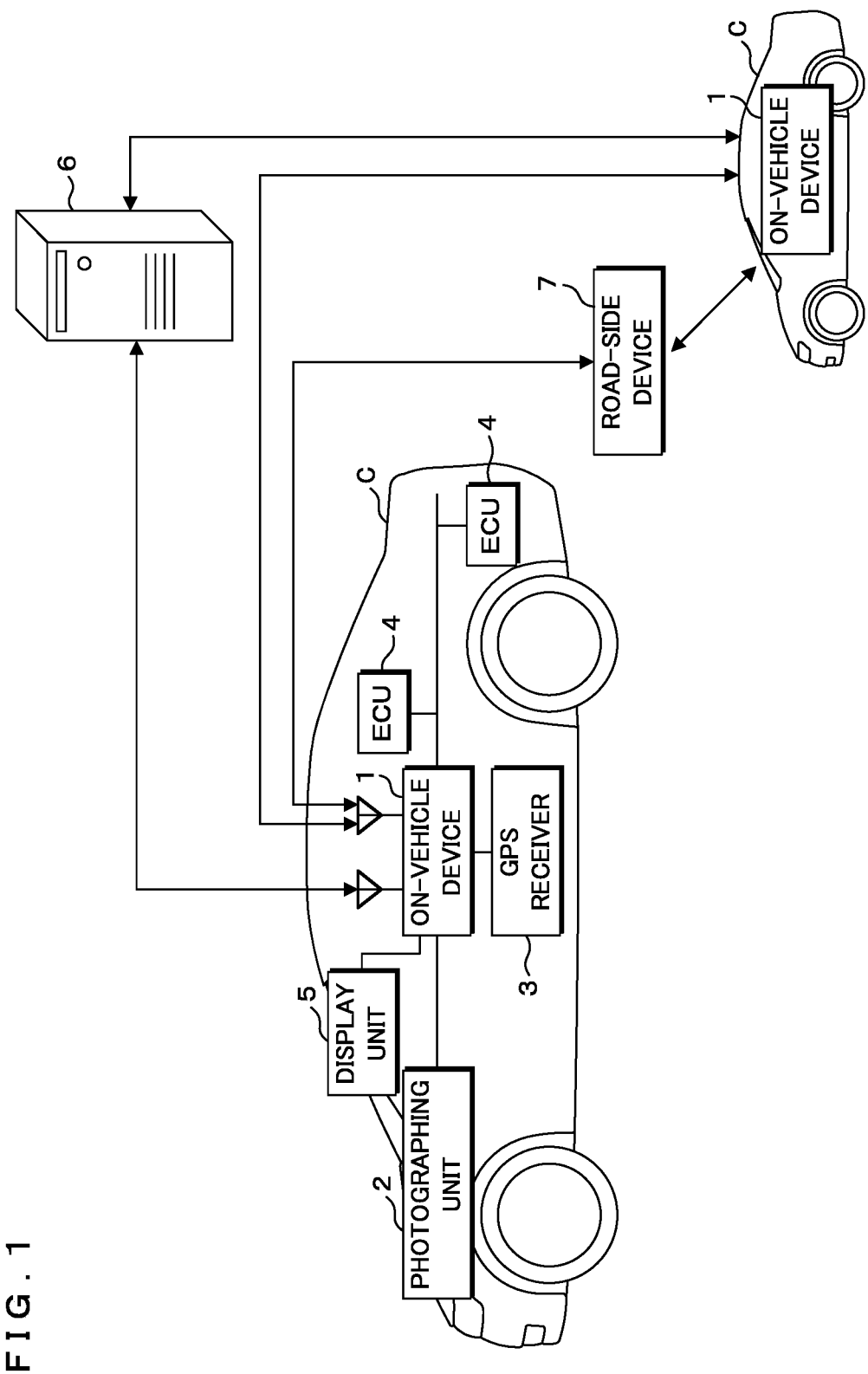
FIG. 1 is a schematic view illustrating one example of the configuration of a road abnormality alert system according to Embodiment 1 of the present disclosure.

Japanese Patent Application Laid-Open No. 2015-138316 merely provides the information on the anomalous traveling place where anomalous traveling of a vehicle occurs and has a problem of being incapable of providing to the vehicle detailed and highly reliable information on an obstruction hindering a vehicle from traveling such as a fallen object, a hole on the road or the like. Furthermore, Japanese Patent Application Laid-Open No. 2015-138316 is configured to provide information on an anomalous travel place via a server and thus has a problem of delaying provision of the information.

The object of the present disclosure is to provide an on-vehicle device and a road abnormality alert system that are capable of transmitting to another vehicle previously-notifying abnormality information with enhanced immediacy for previously notifying abnormality on the road.

[Description of Embodiments of the Present Invention]

Aspects of the present invention are first listed. It is noted that at least parts of the aspects described below may arbitrarily be combined.

(1) An on-vehicle device according to a present aspect comprises an image data acquisition unit that acquires image data obtained by photographing a road from a vehicle; an object detection unit that detects an object included in an image of the road; a location detection unit that detects a location of the vehicle; an image data transmission unit that, in a case where the object is detected by the object detection unit, transmits to an external device image data including the object and location information of the vehicle at the time of detecting the object, and an previously-notifying information transmission unit that transmits to another vehicle previously-notifying abnormality information including the location information of the vehicle at the time of detecting the object and previously notifying abnormality on the road.

The on-vehicle device according to this aspect acquires image data obtained by photographing a road from a vehicle and detects an object included in an image of the road. The object detected here is any tangible object included in the image of the road and is not necessarily an obstruction. The obstruction includes any tangible object that is an obstruction of a vehicle driving on a road. The obstruction is, for example, a fallen object on a road, a triangular stopping plate, a barricade concerning traffic control, an arrow guide plate, a color cone (trademark) or the like. The impediment occurring to a road itself such as a hole on a road is also included in the obstruction. The object detection unit has lower detection accuracy of an obstruction than that of the external device. In the case where an object is detected, the on-vehicle device transmits previously-notifying abnormality information for previously notifying abnormality on the road as well as transmits the image data including the object and the location information of the vehicle to the external device to another vehicle.

Accordingly, the on-vehicle device can transmit previously-notify abnormality information with enhanced immediacy for previously notifying abnormality on a road to another vehicle.

Note that the image data transmission unit according to the aspect (1) may be configured to have a wireless device for performing wireless communication with an external device placed outside or may be configured to perform wireless communication by controlling the operation of a wireless device connected from the outside. The wireless device is, for example, a mobile communication terminal having a wireless communication function such as a smartphone and a cellular phone.

Furthermore, the object detection unit according to the aspect (1) includes a configuration in which detection is performed on the photographing unit-side for photographing a road, and the result of the detection is acquired.

Additionally, the location detection unit according to the aspect (1) may include a configuration in which location information itself is acquired.

Moreover, the previously-notifying information transmission unit is a communication device performing vehicle-to-vehicle communication between the on-vehicle device and that of another vehicle, and also includes a configuration in which previously-notifying abnormality information is transmitted and received via a road-side communication unit set at a road side.

(2) It is preferable that the on-vehicle device comprises: an obstruction information reception unit that receives obstruction information transmitted from the external device; and a determination unit that, in the case where the object is detected by the object detection unit, determines whether or not a location where the object is detected and a location indicated by the received obstruction information correspond to each other, and the previously-notifying information transmission unit transmits previously-notifying abnormality information if determination by the determination unit is negative.

In this aspect, the on-vehicle device can transmit to another vehicle previously-notifying abnormality information as information for previously notifying an obstruction being likely to have not been provided yet by the obstruction information. Accordingly, provision of useless previously-notifying abnormality information that has already been provided as obstruction information may be prevented, which enables transmission of previously-notifying abnormality information with a high degree of reliability to another vehicle.

Note that the obstruction information reception unit according to the aspect (2) may be configured to include a wireless device for performing wireless communication with an external device placed outside or may be configured to perform wireless communication by controlling the operation of a wireless device connected from the outside. The wireless device is, for example, a mobile communication terminal having a wireless communication function such as a smartphone and a cellular phone.

Furthermore, the image data transmission unit that transmits image data or the like and the obstruction information reception unit that receives obstruction information may be communication devices that perform wireless communication according to a common communication protocol but may be configured to receive image data and obstruction information according to different communication protocols or by different communication devices. For example, included is a configuration in which the image data or the like may be transmitted by a mobile communication terminal while the obstruction information may be received by a light beacon, a radio wave beacon, a broadcast radio wave receiver, or the like.

(3) It is preferable that the location detection unit intermittently detects the location of the vehicle, the on-vehicle device further comprises a distance determination unit that determines whether or not the location where the object is detected and a current location are within a predetermined distance from each other, and the previously-notifying information transmission unit transmits previously-notifying abnormality information if the distance determination unit determines that the locations are within the predetermined distance from each other.

According to this aspect, the on-vehicle device transmits previously-notifying abnormality information to another vehicle if the current location of the vehicle and the location where the object is detected are within a predetermined distance from each other. Accordingly, provision of useless previously-notifying abnormality information to a vehicle driving at a place far away from the location where the object is detected may be prevented, which enables transmission of previously-notifying abnormality information with a high degree of reliability to another vehicle.

(4) It is preferable that the on-vehicle device further comprises an elapsed time determination unit that determines whether or not a predetermined time period has elapsed from a time point when the object is detected, and the previously-notifying information transmission unit transmits previously-notifying abnormality information if determination by the elapsed time determination unit is negative.

According to this aspect, the on-vehicle device transmits previously-notifying abnormality information to another vehicle if the elapsed time from the time point when the object is detected is within a predetermined time period. Accordingly, transmission of useless previously-notifying abnormality information for which a long time period has elapsed from detecting the object may be prevented, which enables transmission of previously-notifying abnormality information with a higher degree of reliability to another vehicle.

(5) It is preferable that the on-vehicle device further comprises a behavior abnormality detection unit that detects abnormality of a behavior of the vehicle, and the previously-notifying information transmission unit transmits previously-notifying abnormality information in the case where the object is detected by the object detection unit, and the abnormality of the behavior of the vehicle is detected by the behavior abnormality detection unit.

According to this aspect, the on-vehicle device transmits previously-notifying abnormality information to another vehicle in the case where the object is detected, and the abnormality of the behavior of the vehicle is detected. In the case where the behavior of the vehicle is abnormal, an obstruction is highly likely to exist on the road. Accordingly, previously-notifying abnormality information with a higher degree of reliability can be transmitted.

(6) A road abnormality alert system according to this aspect comprises an external device that collects image data obtained by photographing a road and location information of the road to detect an obstruction on the road and provides obstruction information indicating a location of the road where the obstruction is detected, and a plurality of on-vehicle devices that receive the obstruction information provided from the external device and alert a driver to abnormality on the road based on the received obstruction information. A first on-vehicle device is the on-vehicle device according to any one of the aspects (1) to (5), and a second on-vehicle device comprises an previously-notifying information reception unit that receives previously-notifying abnormality information transmitted from the first on-vehicle device and an abnormality previously-notifying unit that previously notifies abnormality on the road in the case where the previously-notifying abnormality information is received by the previously-notifying information reception unit.

According to this aspect, each of the plurality of on-vehicle devices may receive obstruction information provided from the external device and alert the driver to an obstruction on the road based on the received obstruction information.

However, the external device is configured to collect image data obtained by photographing a road and location information to detect an obstruction on a road, which hampers immediate detection of an obstruction occurring on a road and provision of the obstruction information.

Here, the first on-vehicle device acquires image data obtained by photographing a road from a vehicle and detects an object included in the image of the road. The object detected here is any tangible object included in the image of the road and is not necessarily an obstruction. The object detection unit has lower detection accuracy of an obstruction than that of the external device. In the case where an object is detected, the first on-vehicle device transmits previously-notifying abnormality information previously notifying abnormality on the road as well as transmits image data including the object and the location information of the vehicle to the external device to the second on-vehicle device mounted on another device.

Accordingly, the second on-vehicle device can receive previously-notifying abnormality information, which has enhanced immediacy but has a low degree of reliability, before receiving obstruction information concerning the obstruction detected highly accurately from the external device. The second on-vehicle device may then previously notify the driver of abnormality on the road by the abnormality previously-notifying unit.

Thus, the on-vehicle device can alert a driver to the abnormality on the road with a high degree of accuracy based on the obstruction information as well as previously notify abnormality on a road based on the previously-notifying abnormality information with enhanced immediacy.

It is noted that the previously-notifying information transmission unit and the previously-notifying information reception unit are communication devices for performing vehicle-to-vehicle communication between the first on-vehicle device and the second on-vehicle device, but also included is a configuration in which previously-notifying abnormality information is transmitted and received via a road-side communication device set on a road side.

[Effects of the Disclosure]

According to the present disclosure, it is possible to provide an on-vehicle device and a road abnormality alert system that are capable of transmitting to another vehicle previously-notifying abnormality information with enhanced immediacy for previously notifying abnormality on a road.

[Description of Embodiments of the Present Disclosure]

It is to be noted that, as used herein and in the appended claims, the singular forms "a", "an", and "the" include plural referents unless the context clearly dictates otherwise.

Detailed examples of an on-vehicle device and a road abnormality alert system according to embodiments of the present disclosure will be described below with reference to the drawings. It is to be understood that the present disclosure is illustrative in all respects and not restrictive. The scope of the present disclosure is defined by the appended claims, and all changes that fall within the meanings and the bounds of the claims, or equivalence of such meanings and bounds are intended to be embraced by the claims.

(Embodiment 1)

FIG. 1 is a schematic view illustrating one example of the configuration of a road abnormality alert system according to Embodiment 1 of the present disclosure. The road abnormality alert system includes an on-vehicle device 1, an photographing unit 2, a global positioning system (GPS) receiver 3, various types of ECU 4 and a display unit 5 that are mounted on each of a plurality of vehicles C, a road information providing device 6 being an external server, and a road-side device 7. The on-vehicle device 1 can perform wireless communication with the road information providing device 6 and perform vehicle-to-vehicle communication with an on-vehicle device 1 mounted on another vehicle C. The on-vehicle device 1 can further perform road-side-to-vehicle communication with the road-side device 7.

Figure 2:
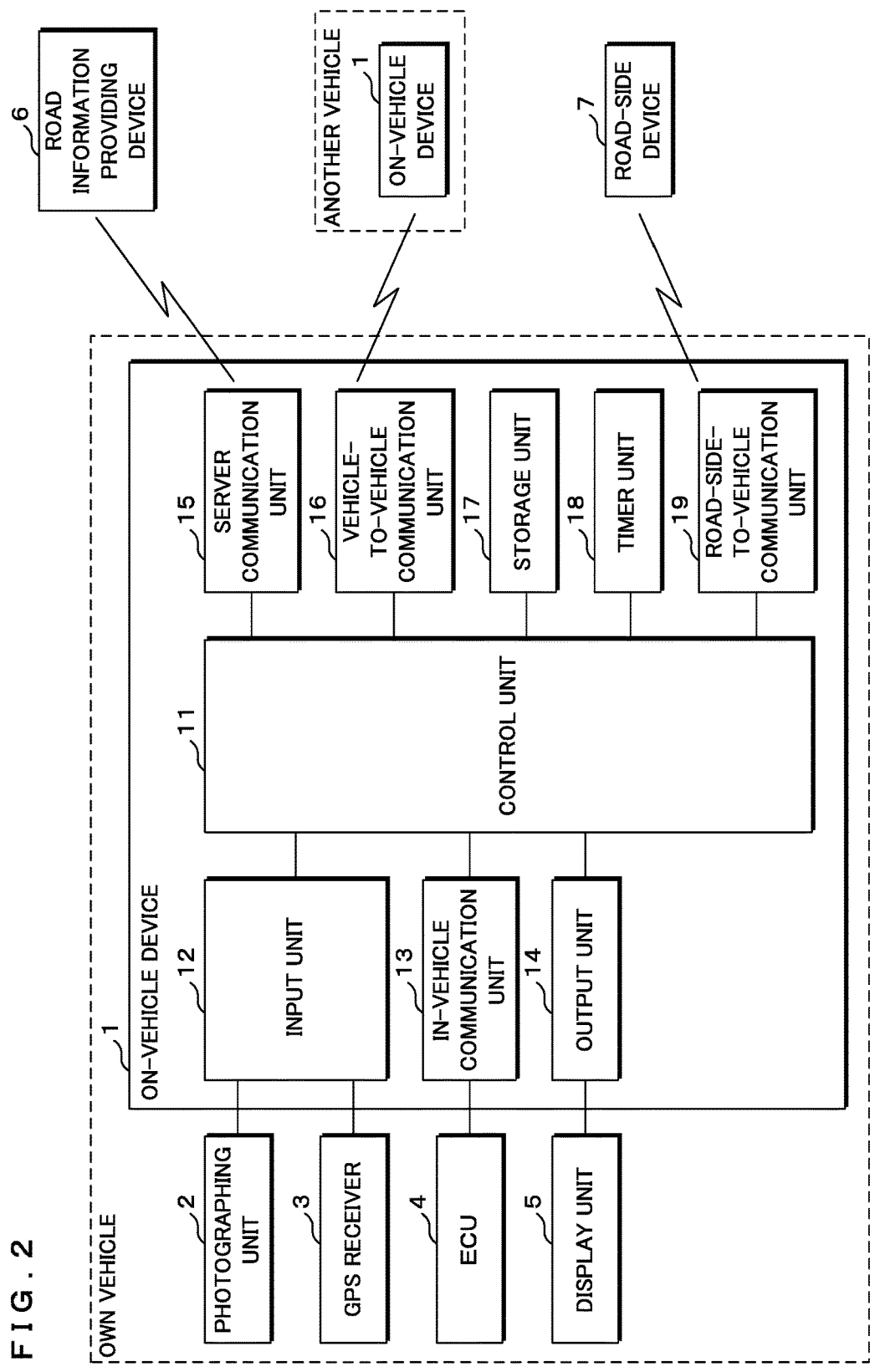
FIG. 2 is a block diagram illustrating one example of the configuration of an on-vehicle device.

FIG. 2 is a block diagram illustrating one example of the configuration of the on-vehicle device 1. The on-vehicle device 1 is a computer, for example, provided with a control unit 11 such as a central processing unit (CPU) for controlling operation of each components in the on-vehicle device 1. To the control unit 11, an input unit 12, an in-vehicle communication unit 13, an output unit 14, a server communication unit 15, a vehicle-to-vehicle communication unit 16, a storage unit 17, a timer unit 18 and a road-side-to-vehicle communication unit 19 are connected.

To the input unit 12, the photographing unit 2 and the GPS receiver 3 are connected.

The photographing unit 2 photographs the road on which the vehicle C is driving and outputs image data obtained by photographing to the on-vehicle device 1. The control unit 11 of the on-vehicle device 1 acquires the image data from the photographing unit 2 via the input unit 12. The control unit 11 may detect an object included in the image of the road from the acquired image data. The control unit 11 of the on-vehicle device 1 detects a tangible object-like thing on a road as an object without executing detailed image recognition processing (see upper part of FIG. 7). This is for reducing the processing load of the on-vehicle device 1. The control unit 11 detects an object by edge detection processing, for example. Note that detection of an obstruction on a road by detailed image recognition processing is performed by the road information providing device 6 of the external server. Alternatively, the detection processing of an object may be performed by the control unit 11 or on the photographing unit 2-side. In the case where the photographing unit 2 performs detection of an object, the control unit 11 acquires the detection result of an object via the input unit 12.

The GPS receiver 3 is mounted on a navigation device, for example, and the GPS receiver 3 as well as a GPS satellite consist of a GPS system. The GPS receiver 3 receives a radio wave from an artificial satellite and outputs, to the on-vehicle device 1, GPS information indicative of the distance or the positional relationship between the GPS satellite and the vehicle C. The control unit 11 acquires the GPS information from the GPS receiver 3 via the input unit 12 and detects the location of the vehicle C. The location of the vehicle C is represented in the form of latitude and longitude, for example. Note that the GPS receiver 3 is not necessarily one used for a navigation device. Alternatively, the on-vehicle device 1 is provided with an interface to be connected to a mobile communication terminal (not illustrated) such as a smartphone or the like having a location measuring function, and the control unit 11 may acquire location information from the mobile communication terminal. Since the mobile communication terminal is inside a vehicle, the location information is also the location information of the vehicle C.

The in-vehicle communication unit 13 is a communication device for performing communication with various types of ECU 4 mounted on the vehicle C according to a communication protocol such as CAN or the like. The control unit 11 performs communication with the ECU 4 via the in-vehicle communication unit 13 and acquires CAN information concerning the behavior of the vehicle C. The CAN information concerning the behavior of the vehicle C includes the velocity and acceleration of the vehicle C, the yaw rate information indicative of the angular velocity in the turning direction of the vehicle C, the steering angle and steering angular velocity of a steering wheel, an operating state of an ABS system, the content of a braking operation, the content of an accelerator operation, and so on. The control unit 11 can specify the behavior of the vehicle C and detect the abnormal behavior of the vehicle C, such as hard braking and abrupt steering based on the CAN information concerning the behavior of the vehicle C.

The display unit 5 is connected to the output unit 14. The display unit 5 is a liquid crystal display, an organic electroluminescent display, an electronic paper, or the like. The control unit 11 outputs alert display information indicative of the abnormality on the road to the display unit 5 via the output unit 14 to thereby alert the driver to an obstruction on the road. Furthermore, the control unit 11 outputs previously-notifying display information previously notifying the possibility of the presence of an obstruction on the road to the display unit 5 via the output unit 14 to thereby previously notify the driver of the presence of an obstruction.

The server communication unit 15 is a communication device for performing wireless communication with the external road information providing device 6. The server communication unit 15 is connected to, for example, a mobile communication terminal having a wireless communication function such as a smartphone or the like and performs wireless communication with the road information providing device 6 by controlling the operation of the mobile communication terminal. For example, the server communication unit 15 transmits to the road information providing device 6 the image data obtained by photographing the road and the information such as the location information indicative of the location where the road is imaged according to the control by the control unit 11. The road information providing device 6 wirelessly transmits to each of the on-vehicle devices 1 the obstruction information indicative of the location of the obstruction on the road while the control unit 11 receives the obstruction information provided from the road information providing device 6 by the server communication unit 15.

The vehicle-to-vehicle communication unit 16 is a communication circuit for performing vehicle-to-vehicle communication with the on-vehicle device 1 mounted on another vehicle C. The vehicle-to-vehicle communication unit 16 performs wireless communication according to a predetermined communication protocol based on IEEE802.11p, for example. The frequency employed for the wireless communication is not limited to a specific frequency, and includes frequencies with a bandwidth of 5.9 GHz, 700 GHz, or the like. In the case where an object is detected from the image data of the road and the vehicle C exhibits an abnormal behavior, the control unit 11 transmits previously-notifying abnormality information to another vehicle C by the vehicle-to-vehicle communication unit 16. The previously-notifying abnormality information includes location information of the road at the time of detecting the obstruction-like object, time information at the time of detecting the object, and so on.

The storage unit 17 is a storage device including a nonvolatile memory such as an electrically erasable programmable ROM (EEPROM), for example, a hard disk or the like and stores dynamic map information. The dynamic map information includes map information utilized for a rout guide employing a car navigation device, for example, and obstruction information including the location information indicative of the location of an obstruction occurring to a road. The map information stores information indicative of the location of a node corresponding to an intersection, information concerning a link connecting each of the nodes, and the like. The location of each node is represented in the form of latitude and longitude, for example. The road link is a road section between adjacent two intersections and logically forms the road on which the vehicle C is driving. Each road link is connected by a node corresponding to an intersection to thereby logically form a road system. The location information included in the obstruction information is a latitude and a longitude indicating the location of an obstruction, for example. Alternately, the location information may relatively indicate the location of an obstruction on a road link in relation to the positions of the nodes at the both ends of the road link.

As described below, the storage unit 17 stores previously-notifying abnormality information including location information indicative of the location of the vehicle C at the time of detecting an object having a probability of being an obstruction, the time of detecting the object or the like. The location information included in the previously-notifying abnormality information is also a latitude and a longitude, or the like similarly to the location information of the obstruction.

The timer unit 18 is a clock for counting time according to control by the control unit 11. The control unit 11 acquires time information from the timer unit 18 in the case where an object is detected, for example. The control unit 11 then adds the time information to the image data. Furthermore, the control unit 11 stores the time information together with the location information of the object in the storage unit 17 as previously-notifying abnormality information. In the case where an object is detected, the timer unit 18 performs processing of counting an elapsed time from the time point when the object is detected and provides the result of the time counting to the control unit 11.

The road-side-to-vehicle communication unit 19 is a communication circuit for performing road-side-to-vehicle communication with the road-side device 7. The road-side-to-vehicle communication unit 19 performs wireless communication according to a predetermined communication protocol similarly to the vehicle-to-vehicle communication. In the case where an object is detected from the image data of the road and the vehicle C exhibits an abnormal behavior, the control unit 11 transmits the previously-notifying abnormality information to the road-side device 7 by the road-side-to-vehicle communication unit 19.

The road-side device 7 includes a road-side control unit, a road-side communication unit, a road-side storage unit and a road-side timer unit. The configuration of each of the components is similar to the configuration of the control unit 11, the road-side-to-vehicle communication unit 19 and the storage unit 17 of the on-vehicle device 1. The road-side device 7 receives previously-notifying abnormality information transmitted from the on-vehicle device 1 by the road-side communication unit and temporarily stores the received previously-notifying abnormality information in the storage unit. The previously-notifying abnormality information includes the time information at the time of detecting the obstruction-like object and thus, the road-side device 7 transmits by the road-side communication unit the previously-notifying abnormality information to vehicles C driving around it until a predetermine time period has elapsed from the time represented by the time information. The on-vehicle device 1 can thus share the previously-notifying abnormality information by using road-side-to-vehicle communication. Generally, since an obstruction does not move, the on-vehicle device 1 can more effectively provide the previously-notifying abnormality information to the on-vehicle device 1 of another vehicle C by transmitting the previously-notifying abnormality information to the on-vehicle device of another vehicle via the road-side device 7 placed at a constant location than via the vehicle-to-vehicle communication.

Note that by performing road-side-to-road-side communication between multiple road-side devices 7, the previously-notifying abnormality information is shared within a predetermined distance range centered about the location where an object is detected, and the shared previously-notifying abnormality information may be transmitted to the on-vehicle device 1 around the devices. For example, a first road-side device 7 receives and stores previously-notifying abnormality information transmitted from the on-vehicle device 1 while transmitting it to a second road-side device 7. The second road-side device 7 receives and stores the previously-notifying abnormality information transmitted from the first road-side device 7 while transmitting the previously-notifying abnormality information to the on-vehicle device 1 of a vehicle C running around it. Thus, the previously-notifying abnormality information may also be shared by road-side-to-vehicle communication and road-side-to-road-side communication.

Figure 3:
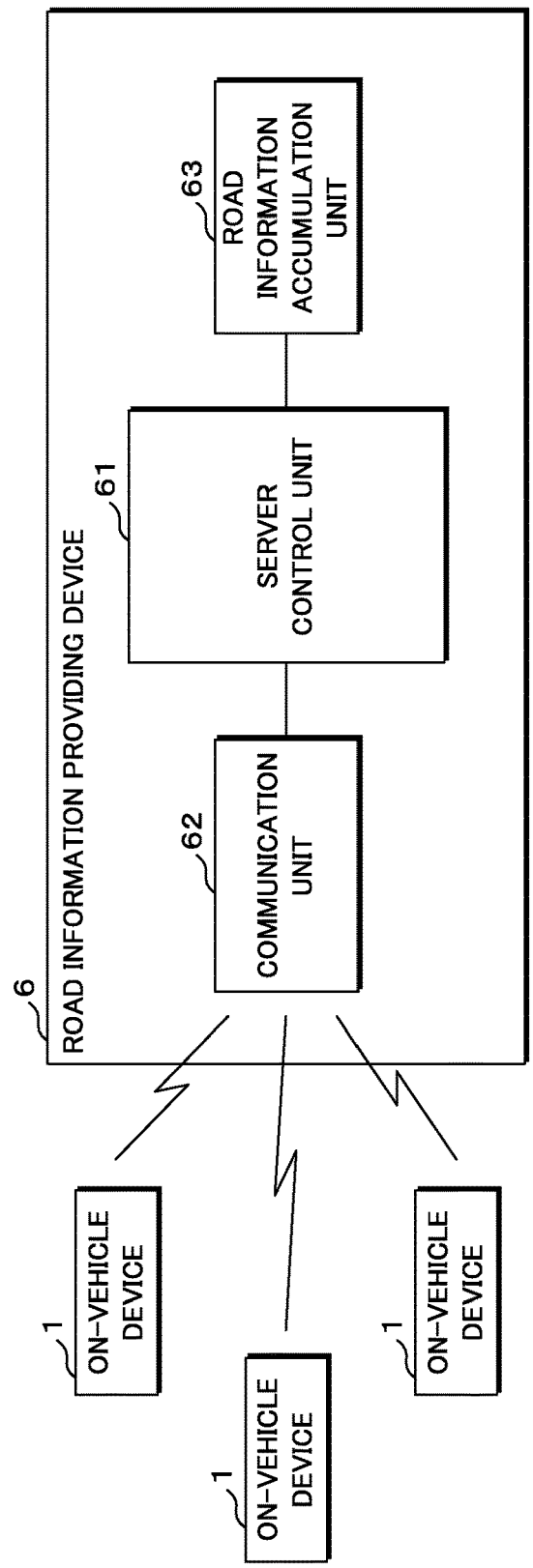
FIG. 3 is a block diagram illustrating one example of the configuration of a road information providing device.

FIG. 3 is a block diagram illustrating one example of the configuration of the road information providing device 6. The road information providing device 6 is a computer including a server control unit 61 such as a CPU, for example. The server control unit 61 is provided with a communication unit 62 and a road information accumulation unit 63 via a bus.

The communication unit 62 performs communication with the on-vehicle device 1 mounted on each of the multiple vehicles C. For example, the communication unit 62 receives the image data of a road transmitted from the on-vehicle device 1, the location information indicative of the location where the road is imaged and so on as information for detecting an obstruction on the road. The image data also includes time information.

The server control unit 61 analyzes the image of the received image data to thereby identify or detect the obstruction on the road. The identification of the obstruction is performed by deep learning, for example. The deep learning is a kind of machine learning and classifies images into predetermine classes (see the lower part of FIG. 7). The road information providing device 6 learns in large number various kinds of images of obstructions such as a fallen object, a triangular stopping plate, a barricade concerning traffic control, an arrow guide plate, a color cone (trademark), a hole on a road and so on, and images of no obstructions such as a vehicle C, words on a road and so on and stores the feature of each of the obstructions and each of the non-obstructions and its corresponding class as a result of learning. The server control unit 61 specifies the class to which an object included in the image data belongs based on the received image data and the result of learning. By specifying the class, whether or not the object is an obstruction, the type of the obstruction and so on are specified.

The road information accumulation unit 63 is a storage device such as a hard disk or the like and accumulates information concerning the obstructions obtained through the analysis of the image data transmitted from the on-vehicle devices 1 of the multiple vehicles C. More specifically, the road information accumulation unit 63 stores the kind of the obstruction and the location information of the obstruction in association with each other. The server control unit 61 performs statistical processing using the information concerning obstructions thus collected and accumulated from the multiple vehicles C to thereby specify the presence or absence of an obstruction, the kind of the obstruction, the location of the obstruction and so on with a high degree of precision.

Figure 4:
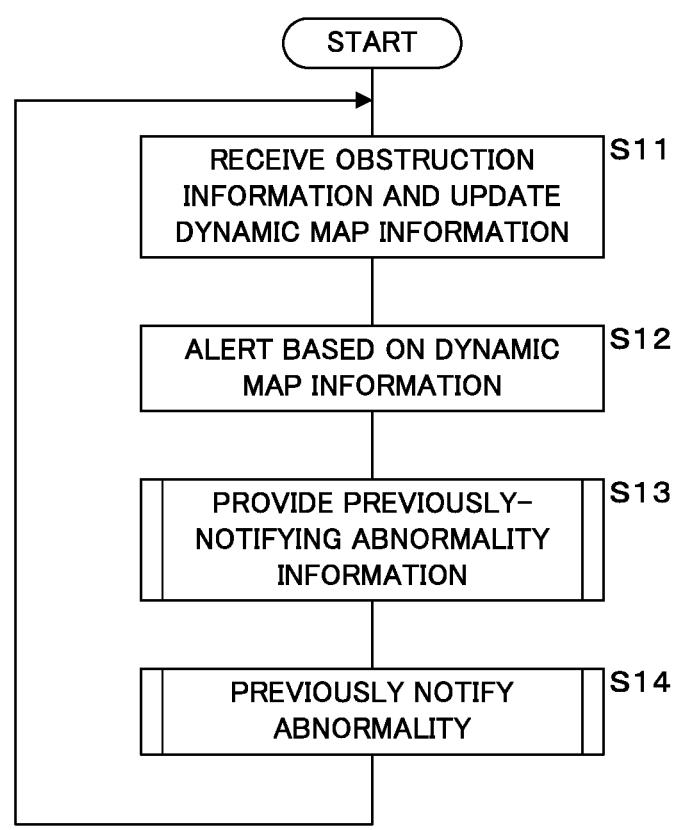
FIG. 4 is a flowchart illustrating a processing procedure of the on-vehicle device.

FIG. 4 is a flowchart illustrating a processing procedure of the on-vehicle device 1. The road information providing device 6 periodically transmits obstruction information as information for updating the road map information. The obstruction information indicates the location, kind and so on of an obstruction on a road. The control unit 11 of the on-vehicle device 1 receives the obstruction information transmitted from the road information providing device 6 and updates dynamic map information (step S11). The control unit 11 then performs alert processing based on the dynamic map information (step S12). More specifically, the control unit 11 acquires GPS information to thereby detect the current location of the vehicle C and specifies, by using the detected location information of the vehicle C, the presence or absence of an obstruction at the current location and on the travel path to the destination and the kind of the obstruction with reference to the dynamic map information. If an obstruction is specified, the control unit 11 outputs alert display information for alerting the presence of the obstruction to the display unit 5 via the output unit 14 and alerts the abnormality on the road.

The control unit 11, which has completed the processing at step S12, performs processing of providing previously-notifying abnormality information with enhanced immediacy by the vehicle-to-vehicle communication to another vehicle C (step S13). The control unit 11 further executes processing concerning previously notifying abnormality based on the previously-notifying abnormality information provided from another vehicle C (step S14). The control unit 11, which has completed the processing at step S14, returns the processing to step S11 to repeatedly execute the processing from steps S11 to S14.

The detail of the processing concerning step S13 will be described as subroutine processing.

Figure 5:
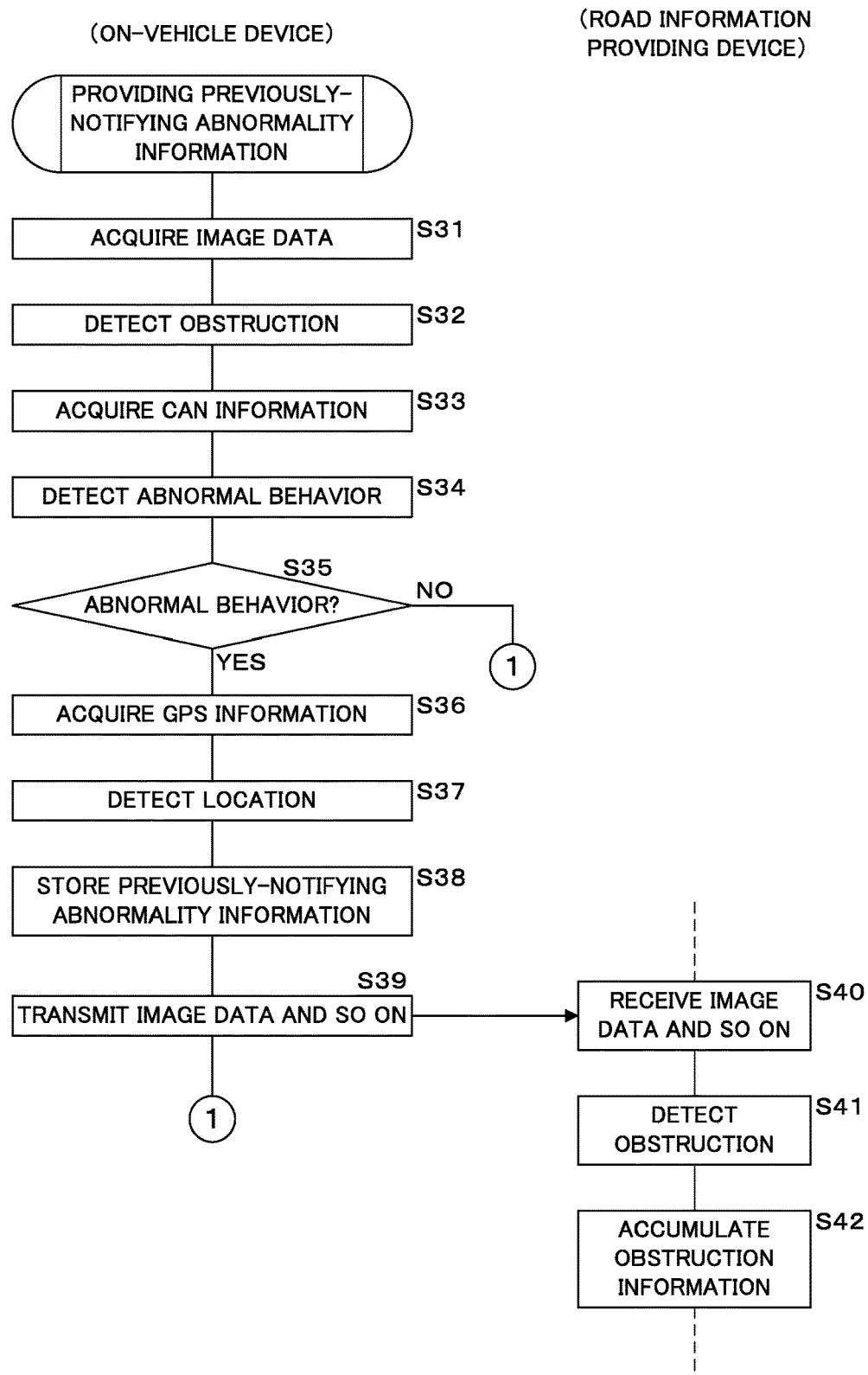
FIG. 5 is a flowchart illustrating a processing procedure concerning provision of previously-notifying abnormality information.
Figure 6:
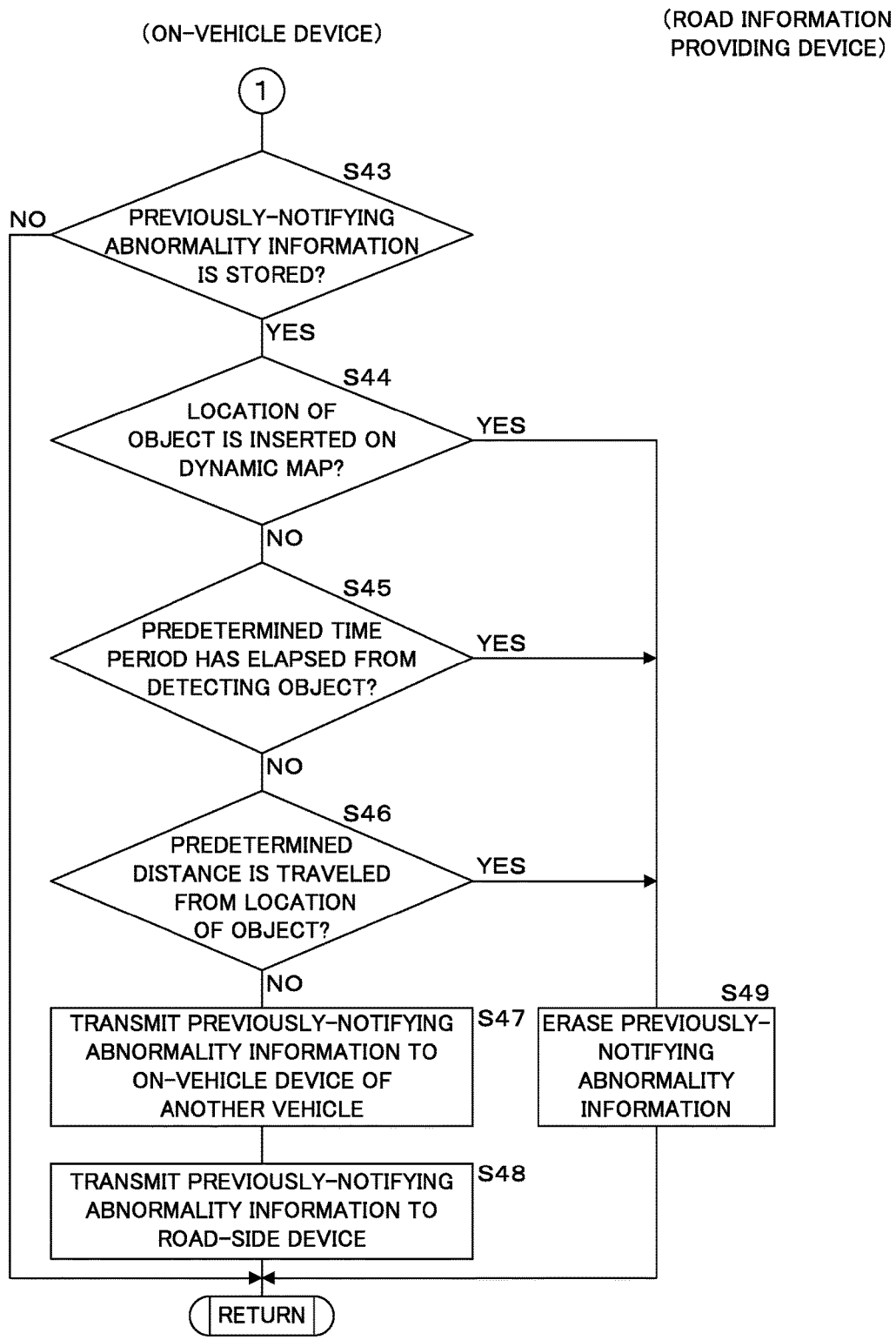
FIG. 6 is a flowchart illustrating the processing procedure concerning provision of the previously-notifying abnormality information.

Each of FIG. 5 and FIG. 6 is a flowchart illustrating a processing procedure concerning provision of previously-notifying abnormality information. FIG. 7 is a schematic view illustrating object detection and obstruction detection. The control unit 11 of the on-vehicle device 1 acquires from the photographing unit 2 image data obtained by photographing a road (step S31). The control unit 11 then detects an obstruction-like object from the image data as illustrated at the upper part of FIG. 7 (step S32). On the on-vehicle-device 1 side, low-load processing such as edge detection or the like is performed to detect an obstruction-like object, but detailed image recognition processing is not performed. The control unit 11 executing the processing at steps S31 and S32 functions as an image data acquisition unit and an object detection unit in an aspect (1).

Next, the control unit 11 acquires CAN information concerning the behavior of the vehicle C by the in-vehicle communication unit 13 (step S33) and detects the abnormal behavior of the vehicle C based on the acquired CAN information (step S34). The control unit 11 executing the processing at steps S33 and S34 functions as a location detection unit in the aspect (1).

Subsequently, the control unit 11 determines whether or not the behavior of the vehicle C is abnormal (step S35). If it is determined that the behavior of the vehicle C is abnormal (step S35: YES), the control unit 11 acquires GPS information concerning the location of the vehicle C from the GPS receiver 3 (step S36) and detects the location of the vehicle C (step S37). The control unit 11 then stores previously-notifying abnormality information including the location information where the object is detected, a time of detecting the object, and so on (step S38).

The control unit 11 then transmits the image data of the detected object, the location information indicative of the location where the object is detected, and so on to the road information providing device 6 by the server communication unit 15 (step S39). It is noted that the control unit 11 executing the processing at step S39 functions as an image data transmission unit in the aspect (1).

The server control unit 61 of the road information providing device 6 receives the image data, the location information and so on (step S40) and performs detection of an obstruction based on the received image data (step S41). More specifically, the server control unit 61 specifically identifies the class of the object included in the image data as illustrated at the lower part of FIG. 7 to thereby detect an obstruction. If the object is identified as being equivalent to a class such as "vehicle," "road character" and the like, the server control unit 61 executes processing considering that no obstruction is detected. If the object is identified as being equivalent to a class such as "fallen object" and the like, the server control unit 61 executes processing considering that an obstruction is detected.

Subsequently, if an obstruction is detected at step S41, the server control unit 61 accumulates the kind, the location information and the like of the obstruction into the road information accumulation unit 63 (step S42). The server control unit 61 periodically generates obstruction information by using the information accumulated in the road information accumulation unit 63 and transmits the generated obstruction information to the on-vehicle device 1 of each vehicle C.

Meanwhile, the control unit 11 of the on-vehicle device 1, which has completed the processing at step S39, determines whether or not previously-notifying abnormality information is currently stored (step S43). If it is determined that no previously-notifying abnormality information is stored (step S43: NO), the control unit 11 ends the processing. If it is determined that previously-notifying abnormality information is stored (step S43: YES), the control unit 11 determines whether or not the location of the object detected by its own vehicle C is inserted as the location of the obstruction on the dynamic map (step S44). That is, the control unit 11 determines whether or not the location detected by its own vehicle C and the location of the obstruction indicated by the dynamic map information correspond to each other. The control unit 11 executing the processing at step S44 functions as a determination unit in an aspect (2).

If it is determined the location of the object detected by its own vehicle C has not been inserted as the location of the obstruction on the dynamic map (step S44: NO), the control unit 11 determines whether or not a predetermine time period has elapsed from detecting the object (step S45). The control unit 11 executing the processing at step S45 functions as an elapsed time determination unit in an aspect (4).

If it is determined that a predetermined time period has not elapsed after the detection of the object (step S45: NO), the control unit 11 determines whether or not a predetermined distance is traveled from the location where the object is detected (step S46). That is, the control unit 11 determines whether or not the location where the object is detected and the current location of the vehicle C are present within a predetermined distance from each other. The control unit 11 executing the processing at step S46 functions as a distance determination unit in an aspect (3).

If it is determined that the location where the object is detected is within a predetermined distance (step S46: NO), the control unit 11 transmits previously-notifying abnormality information indicative of the location of the road where the object is detected, the detected time, and the like to another vehicle C by the vehicle-to-vehicle communication unit 16 (step S47). Next, the control unit 11 transmits the previously-notifying abnormality information indicative of the location of the road where the object is detected, the detected time, and the like to the road-side device 7 by the road-side-to-vehicle communication unit 19 (step S48) and ends the processing of the subroutine. The road-side device 7 receives the previously-notifying abnormality information transmitted from the on-vehicle device 1 and stores the received previously-notifying abnormality information in the road-side storage unit.

If it is determined that the location of the object detected by its own vehicle C has been inserted as the location of the obstruction on the dynamic map (step 44: YES), if it is determined a predetermine time period has elapsed after the detection of the object (step S45: YES), or if it is determined that the location where the object is detected is not present within a predetermined distance (step S46: YES), the control unit 11 erases the previously-notifying abnormality information (step S49) and ends the processing.

The detail of the processing concerning step S14 will be described as subroutine processing.

FIG. 8 is a flowchart illustrating a processing procedure concerning previously notifying abnormality. The on-vehicle device 1 of another vehicle C that has detected an object transmits previously-notifying abnormality information to a vehicle C around it (step S71). Meanwhile, the road-side device 7 that has stored the previously-notifying abnormality information transmits the previously-notifying abnormality information to a vehicle C around it (step S72). The road-side device 7 transmits the previously-notifying abnormality information concerning the object until a predetermine time has elapsed from the detected time of the object stored in the road-side storage unit, for example. The on-vehicle device 1 of its own vehicle C receives the previously-notifying abnormality information transmitted from another vehicle C by the vehicle-to-vehicle communication unit 6 or the previously-notifying abnormality information transmitted from the road-side device 7 by the road-side-to-vehicle communication unit 19 (step S73). If the location indicated by the previously-notifying abnormality information is present at the current location and on the travel path to the destination, the control unit 11 outputs previously-notifying display information to the display unit 5 to thereby previously notify the presence of an obstruction (step S74) and ends the processing concerning the subroutine. The control unit 11 executing the processing at step S74 functions as an abnormality previously-notifying unit in the aspect (1).

According to the on-vehicle device 1 and the road abnormality alert system that are thus configured, it is possible to previously notify the abnormality on a road based on the previously-notifying abnormality information with enhanced immediacy obtained by the vehicle-to-vehicle communication and to alert the driver to the abnormality on the road very accurately based on the obstruction information with a high degree of reliability provided from the road information providing device 6.

Furthermore, in the case where an object is detected at a location where no information as an obstruction is presented in the dynamic map information, the previously-notifying abnormality information is configured to be transmitted to another vehicle C, which prevents transmission of useless previously-notifying abnormality information to another vehicle C. This makes it possible to provide the previously-notifying abnormality information with a higher degree of reliability.

Additionally, in the case where the location of the current processing and the location where an object is detected are present within a predetermined distance from each other, the previously-notifying abnormality information is configured to be transmitted to another vehicle C, which prevents transmission of useless previously-notifying abnormality information to another vehicle C. This makes it possible to provide the previously-notifying abnormality information with a higher degree of reliability.

In addition, in the case where the elapsed time from detecting the object is within a predetermined time period, the previously-notifying abnormality information is configured to be transmitted to another vehicle C, which prevents transmission of useless previously-notifying abnormality information for which a long time period has elapsed from detecting the object to another vehicle C. This makes it possible to provide the previously-notifying abnormality information with a higher degree of reliability.

Moreover, in the case where an object is detected and the abnormality of the behavior of the vehicle C is detected, the previously-notifying abnormality information is configured to be transmitted to another vehicle C, which enables provision of the previously-notifying abnormality information with a higher degree of reliability to another vehicle C.

(Embodiment 2)

Since the configuration of the road abnormality alert system according to Embodiment 2 is similar to that of Embodiment 1 and is different only in the processing procedure, the difference will mainly be described below.

FIG. 9 is a flowchart illustrating a processing procedure of provision of previously-notifying abnormality information according to Embodiment 2. The control unit 11 executes at steps S231-S236 processing similar to the processing at steps S31-S34, step S36 and step S37.

The control unit 11 determines whether or not the behavior of the vehicle C is abnormal (step S237). If it is determined the behavior of the vehicle C is abnormal (step S237: YES), the control unit 11 executes the processing at step S38 onward in Embodiment 1.

If it is determined the behavior of the vehicle C is not abnormal (step S237: NO), the control unit 11 determines whether or not the location where no object is detected has been inserted as a location of the obstruction on the dynamic map (step S238). More specifically, the control unit 11 determines whether or not the location where no object is detected and the location of the obstruction indicated by the dynamic map information correspond to each other. If it is determined that it has been inserted as an obstruction (step S238: YES), obstruction disappearing information indicating that an obstruction disappears is transmitted to the road information providing device 6 by the server communication unit 15 (step S239).

The server control unit 61 of the road information providing device 6 receives the obstruction disappearing information transmitted from the on-vehicle device 1 (step S240) and accumulates the received obstruction disappearing information in the road information accumulation unit 63 (step S241). The server control unit 61 erases the obstruction information at this location in the case of receiving the obstruction disappearing information for predetermined number of times or more.

Meanwhile, it is determined that it has not been inserted as an obstruction at step S238 (step S238: NO), or after completion of the processing at step S239, the control unit 11 executes the processing at step S43 onward in Embodiment 1.

In the road information provision system according to Embodiment 2, the abnormality disappearing information transmitted from the on-vehicle device 1 is accumulated, and based on the accumulated abnormality disappearing information, the obstruction information may be erased and updated promptly.

DESCRIPTION OF REFERENCE NUMERALS 1 on-vehicle device
2 photographing unit
3 GPS receiver
4 ECU
5 display unit
6 road information providing device
7 road-side device 11 control unit
12 input unit
13 in-vehicle communication unit
14 output unit
15 server communication unit
16 vehicle-to-vehicle communication unit
17 storage unit
18 timer unit
19 road-side-to-vehicle communication unit
61 server control unit
62 communication unit
63 road information accumulation unit
C vehicle

The invention claimed is:

1. An on-vehicle device, comprising:
   an image data acquisition unit that acquires image data obtained by photographing a road from a vehicle;
   an object detection unit that detects an object included in an image of the road;
   a location detection unit that detects a location of the vehicle;
   an image data transmission unit that, in a case where the object is detected by the object detection unit, transmits to an external device image data including the object and location information of the vehicle at a point of time when the object is detected, the external device collecting the image data and the location information to detect an obstruction on the road more accurately than the object detection unit does and providing obstruction information indicating a location of the road where the obstruction is detected, and
   an previously-notifying information transmission unit that transmits to another vehicle previously-notifying abnormality information including the location information of the vehicle at a point of time when the object is detected and previously notifying abnormality on the road before the external device provides the another vehicle with the obstruction information.

2. The on-vehicle device according to claim 1 further comprising:
   an obstruction information reception unit that receives obstruction information transmitted from the external device; and
   a determination unit that, in a case where the object is detected by the object detection unit, determines whether or not a location where the object is detected and a location indicated by received obstruction information correspond to each other,
   wherein the previously-notifying information transmission unit transmits previously-notifying abnormality information if determination by the determination unit is negative.

3. The on-vehicle device according to claim 1, wherein
   the location detection unit intermittently detects the location of the vehicle,
   the on-vehicle device further comprises a distance determination unit that determines whether or not the location where the object is detected and a current location are within a predetermined distance from each other, and
   the previously-notifying information transmission unit transmits previously-notifying abnormality information if the distance determination unit determines that the locations are within the predetermined distance from each other.

4. The on-vehicle device according to claim 1, further comprising an elapsed time determination unit that determines whether or not a predetermined time period has elapsed from a time point at a point of time when the object is detected, wherein
   the previously-notifying information transmission unit transmits previously-notifying abnormality information if determination by the elapsed time determination unit is negative.

5. The on-vehicle device according to claim 1 further comprising a behavior abnormality detection unit that detects abnormality of a behavior of the vehicle, wherein
   the previously-notifying information transmission unit transmits previously-notifying abnormality information in a case where the object is detected by the object detection unit, and the abnormality of the behavior of the vehicle is detected by the behavior abnormality detection unit.

6. A road abnormality alert system comprising an external device that collects image data obtained by photographing a road and location information of the road to detect an obstruction on the road and provides obstruction information indicating a location of the road where the obstruction is detected, and a plurality of on-vehicle devices that receive the obstruction information provided from the external device and alert a driver to abnormality on the road based on received obstruction information, wherein
   a first on-vehicle device is the on-vehicle device according to claim 1, and
   a second on-vehicle device comprises
      an previously-notifying information reception unit that receives previously-notifying abnormality information transmitted from the first on-vehicle device and
      an abnormality previously-notifying unit that previously notifies abnormality on the road in a case where the previously-notifying abnormality information is received by the previously-notifying information reception unit.

* * * * *

UNITED STATES PATENT AND TRADEMARK OFFICE
CERTIFICATE OF CORRECTION

PATENT NO. : 10,446,026 B2
APPLICATION NO. : 16/074509
DATED : October 15, 2019
INVENTOR(S) : Jun Hayakawa et al.

Page 1 of 1

It is certified that error appears in the above-identified patent and that said Letters Patent is hereby corrected as shown below:

On the Title Page

Item (73), please replace "Sumitomo Electric Industries, Inc., Osaka-shi (JP)" with --Sumitomo Electric Industries, Ltd., Osaka-shi (JP)--.

Signed and Sealed this
First Day of September, 2020

Andrei Iancu
*Director of the United States Patent and Trademark Office*